United States Patent
Km et al.

(10) Patent No.: US 10,222,849 B2
(45) Date of Patent: Mar. 5, 2019

(54) POWER PHASE ENERGY LEVEL MONITORING AND MANAGEMENT IN A DATA CENTER

(71) Applicant: INTERNATIONAL BUSINESS MACHINES CORPORATION, Armonk, NY (US)

(72) Inventors: Shankar Km, Bangalore (IN); Mahendra K. Mavilla Venkata, Bangalore (IN); Kiruthikalakshmi Periasamy, Erode (IN); Anuradha Rao, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 15/249,999

(22) Filed: Aug. 29, 2016

(65) Prior Publication Data
US 2018/0059765 A1    Mar. 1, 2018

(51) Int. Cl.
*G06F 1/32*      (2006.01)
*G06F 1/3206*    (2019.01)
*G06F 9/50*      (2006.01)
*G06F 1/3234*    (2019.01)

(52) U.S. Cl.
CPC ......... *G06F 1/3206* (2013.01); *G06F 1/3234* (2013.01); *G06F 9/5094* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 8,351,192 B2 | 1/2013 | Archibald et al. | |
| 8,639,482 B2 | 1/2014 | Rasmussen et al. | |
| 8,762,752 B2 | 6/2014 | Inbaraj et al. | |
| 9,043,173 B2 | 5/2015 | Lehmann et al. | |
| 9,166,410 B1 * | 10/2015 | Kim | H02J 3/26 |
| 2010/0070282 A1 | 3/2010 | Cho et al. | |
| 2010/0211669 A1 * | 8/2010 | Dalgas | G06F 9/5027 709/224 |
| 2013/0253861 A1 * | 9/2013 | Nicholson | G06F 11/3062 702/62 |
| 2016/0048185 A1 | 2/2016 | Liang et al. | |
| 2016/0313779 A1 * | 10/2016 | Gupta | H02J 3/26 |
| 2017/0093161 A1 * | 3/2017 | Kocarev | H02J 3/28 |
| 2017/0353030 A1 * | 12/2017 | Al Jabri | H02J 3/005 |

OTHER PUBLICATIONS

Benner, "Optical Interconnect Opportunities in Supercomputers and High End Computing," OFC/NFOEC Technical Digest, Mar. 2012 (60 pages).
Shuaib et al., "Communications in Smart Grid: A Review with Performance, Reliability and Security Consideration," Journal of Networks, vol. 8, No. 6, Jun. 2013 (12 pages).

* cited by examiner

*Primary Examiner* — Zahid Choudhury
(74) *Attorney, Agent, or Firm* — Griffiths & Seaton PLLC

(57) ABSTRACT

Embodiments for efficient phase level energy monitoring of a data center by at least a portion of a processor. Power consumption of each power phase of a three-phase power is monitored to generate a derived power utilization over a selected time period. The derived power utilization over the selected time period is used to load balance an overloaded power phase.

14 Claims, 11 Drawing Sheets

POWER PHASE ENERGY LEVEL MONITORING AND MANAGEMENT IN A DATA CENTER

BACKGROUND OF THE TECHNOLOGY

Field of the Technology

The present technology relates in general to computing systems, and more particularly to, various embodiments for power phase energy level monitoring in a data center using a computing processor.

Description of the Related Art

Computing systems may be found in the workplace, at home, or at school. Computing systems may include computing and data storage systems to process and store data. Given the increased use of computing systems that employ the use of the Internet, with millions of people now accessing the global network, the bandwidth demanded by each of those users also continues to grow substantially. As a result, many information providers are building large computing facilities, known as data centers, which can provide various services to Internet users.

Data centers are constantly undergoing a transformation, operational improvement, new design principles, and changes in the data center supply chain. Thus, modern data centers are forming increasingly complex environments with many variables that must be taken into account when considering methods to optimize their efficiency. Along with these various transformations comes the issue of energy efficiency and resource management, which will be vital to the success and long-term sustainment of these modern data centers. Currently, there exists a gap in monitoring and controlling power consumption supplied to the data center, which is limiting data centers to optimizing efficiency.

SUMMARY OF THE TECHNOLOGY

Various embodiments for efficient phase level energy monitoring of a data center by at least a portion of a processor are provided. Power consumption of each power phase of a three-phase power is monitored to generate a derived power utilization over a selected time period. The derived power utilization over the selected time period is used to load balance an overloaded power phase.

BRIEF DESCRIPTION OF THE DRAWINGS

In order that the advantages of the technology will be readily understood, a more particular description of the technology briefly described above will be rendered by reference to specific embodiments that are illustrated in the appended drawings. Understanding that these drawings depict only typical embodiments of the technology and are not therefore to be considered to be limiting of its scope, the technology will be described and explained with additional specificity and detail through the use of the accompanying drawings, in which.

DETAILED DESCRIPTION OF THE DRAWINGS

Figure 1:
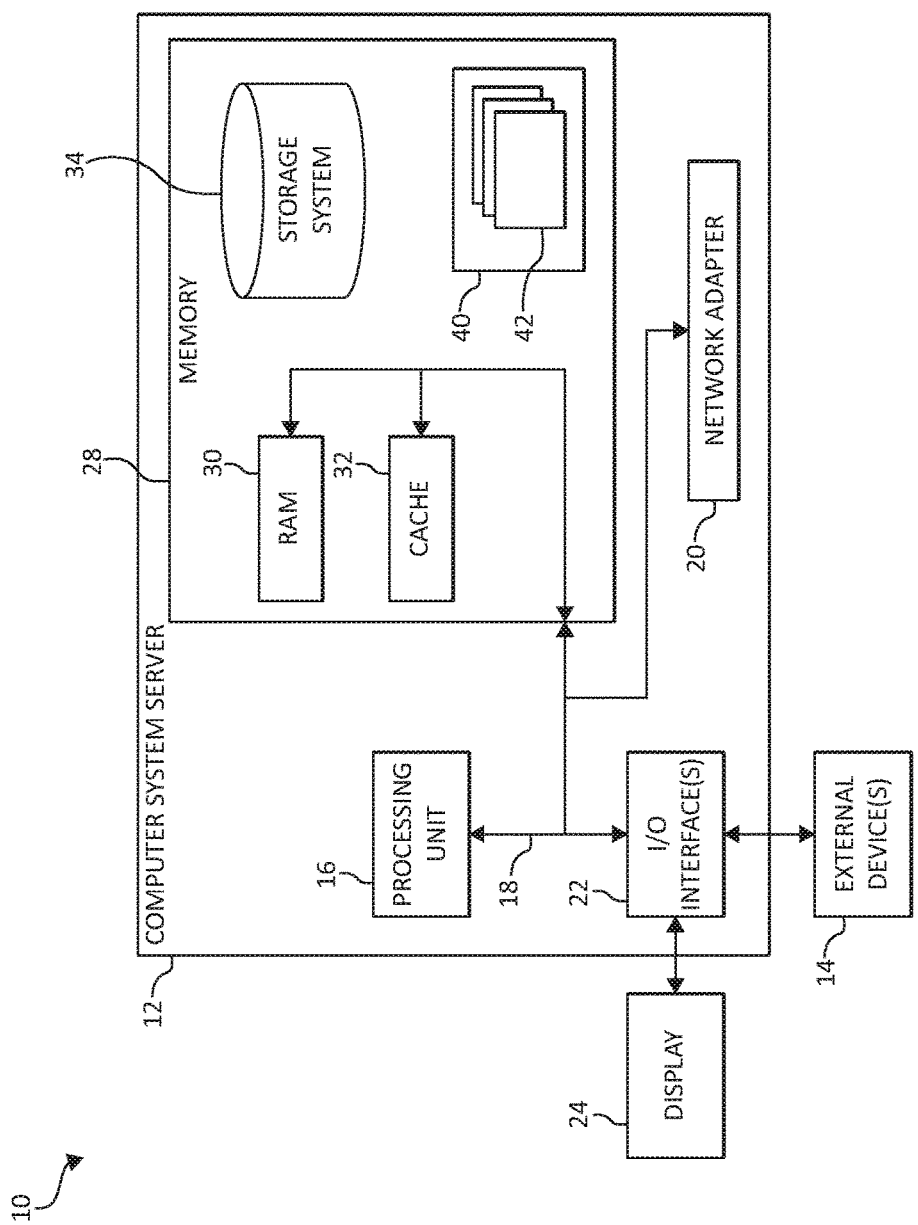
FIG. 1 is a block diagram depicting an exemplary cloud computing node according to an embodiment of the present technology.

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flowcharts and processes are provided for clarity in illustrating steps and operations and do not necessarily indicate a particular order or sequence.

As used herein, the following parameters and acronyms may be defined as follows. Power consumption in real-time may be represented as "$PCon_r$". A monthly power consumption may be represented as "$PCon_m$", a device identification (ID) may be represented as "$D_i$" A device serial number may be represented as "DSNo". Device category may be represented as "$D_{cat}$". Device phase may be represented as "$D_p$". A number (No.) of devices may be represented as "n". A timestamp may be represented as "t". Rack distribution unit (RDU) Serial Number may be represented as "RDUSNo". A server serial number may be represented as "SSNo". A rack's monthly power consumption may be represented as "$RkPCon_m$". A power phase's monthly power consumption may be represented as "$PPCon_m$".

As used herein, "data center" may include any facility or portion of a facility in which computer operations are carried out. A data center may include servers dedicated to specific functions or serving multiple functions. Examples of computer operations include information processing, communications, simulations, and operational control. The data center may include various resources, equipment, or devices that support or ensure data center equipment functionality. Examples of data center resources can include power, cooling, physical space, weight support, remote equipment control capability, physical and logical security and physical and logical network connectivity. Power data center resources may include power distribution resources, such as transformers, power distribution units, outlets, and power available for distribution, such as utility power supplied to data center, power generated by an onsite generator and power supplied by power distribution units. Physical space resources in data center may include data center floor space and rack U space. Cooling resources in data center may include cooling distribution capacity and cooling generation capacity. Physical security resources in data center may include security cameras and door locks. Logical network connectivity resources in data center may include Virtual Local Area Networks, Domain Name Services, and Dynamic Host Configuration Protocol Services. Physical network connectivity resources may include network cabling and patch panels. Remote equipment control capability resources in data center may also be included. In short, a data center may contain a number of racks of equipment that require power, cooling, and connections to external communications facilities.

The increased density of computing equipment used in a data center may place significant strains on associated power systems. Because the computing equipment generates a significant amount of heat in operation, the cooling systems of these facilities are strained as well. As the type, size, and complexity of data centers grow, so do the costs associated with their operation. These costs include energy cost associated with power usage, the cost for acquiring electronic devices and infrastructure, the cost of associated cooling or heat dissipation systems, and administration costs.

Moreover, the power supplied to the equipment in Data Centers (DC) is not automatically measured and controlled. Without an appropriate power measurement control mechanism in a data center, it is difficult to determine whether a data center is either over utilized or under-utilized in terms of power consumption. For example, in one aspect, a main power panel of a data center may distribute power from an Uninterrupted Power Supply (UPS) through three power phases (an "R" phase which may start at 0 degrees, a "Y" phase which may start at 120 degrees, and a "B" phase that can start at 240 degrees). That is, the UPS may supply a three-phase alternating current (AC) power supply to the main power panel for distribution. While the three phases are intended to be equally loaded, equal distribution rarely, if ever, occurs in the data center. For example, one of the phases, such as the R phase, may be over utilized while the Y phase or B phase may be under-utilized. Given the unknown of the load balance of the three phases of power, the data center can suffer costly power dips resulting from deployment of any new or addition equipment in the data center. Thus, any new or addition equipment deployment, such as adding an unused rack or server to the data center requires a pre-requisite action of increasing the capacity of the UPS prior to equipment installation to compensate for the potential power drop. Such pre-requisites are costly and inefficient.

Accordingly, the present technology provides a solution for efficient phase level energy monitoring in a data center by at least a portion of a processor. Power consumption of each power phase of a three-phase power is monitored to generate a derived power utilization over a selected time period. The derived power utilization over the selected time period is used to load balance an overloaded power phase.

In an additional aspect, the present technology provides for monitoring, by a primary power distribution unit (PDU), power consumption from an uninterruptible power supply (UPS) by each one of a plurality of racks and rack distribution units (RDUs) connected to each power phase of the UPS within the data center such that results of the monitoring are stored in a database of the primary PDU. The power consumption of each power phase occurring at each one of the racks and the RDUs may be measured while also measuring temperature levels, electromagnetic interference (EMI) levels, and size parameters, including slot availability, for each one of the racks and the RDUs during a selected time period. An aggregated power consumption amount derived over a course of a defined period of time may be extrapolated back to the UPS according to the measuring the power consumption of the racks and the RDUs for each power phase to enable load balancing of each power phase.

It should also be noted that data in the data center may be processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud" or "cloud-based" storage.

It is understood in advance that although this disclosure includes a detailed description on cloud computing, implementation of the teachings recited herein are not limited to a cloud-computing environment. Rather, embodiments of the present technology are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud-computing node is shown. Cloud computing node 10 is only one example of a suitable cloud-computing node and is not intended to suggest any limitation as to the scope of use or functionality of embodiments of the technology described herein. Regardless, cloud-computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud-computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the technology.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the technology as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
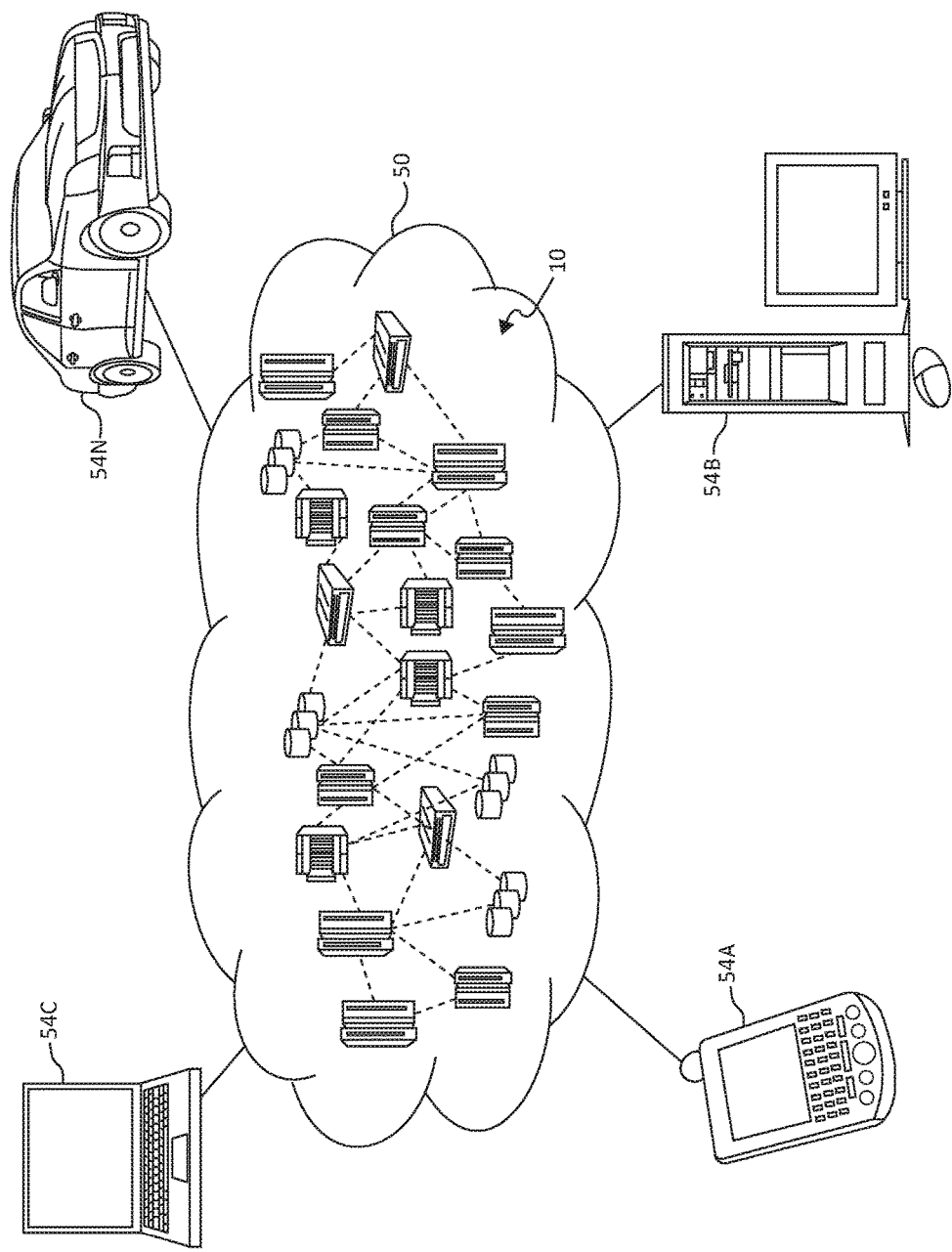
FIG. 2 is an additional block diagram depicting an exemplary cloud computing environment according to an embodiment of the present technology.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
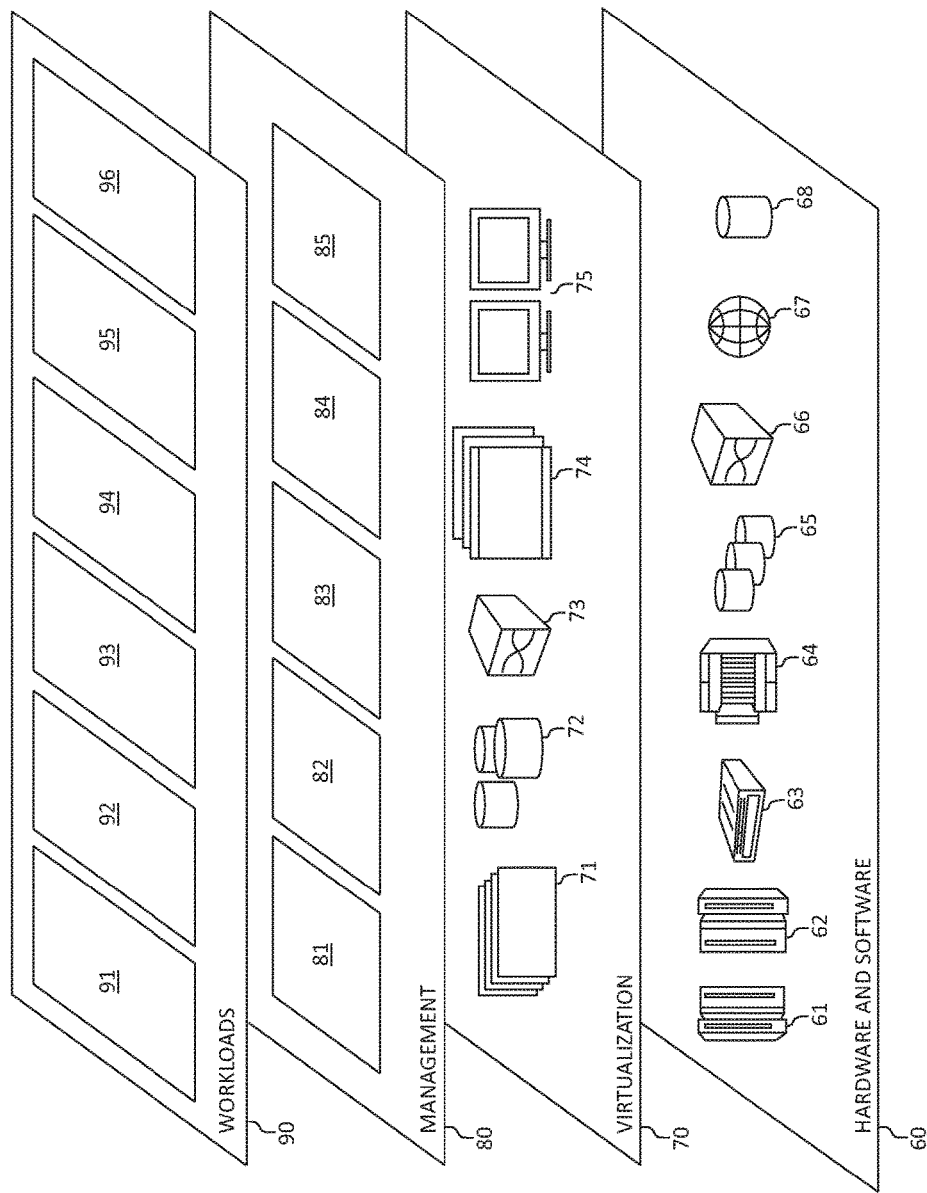
FIG. 3 is an additional block diagram depicting abstraction model layers according to an embodiment of the present technology.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the technology are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 (e.g., load balancing services) provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present technology, various registration enforcement service workloads and functions 96. In addition, workloads and functions 96 may include such operations as load balancing functionality, analytic functionality, comparison and matching analytics, measuring and calculating functionality as relayed to an application, and as will be further described, user and device management functions. One of ordinary skill in the art will appreciate that the load balancing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present technology.

As previously mentioned, the mechanisms of the illustrated embodiments provide novel approaches for efficient phase level energy monitoring of a data center by at least a portion of a processor. Power consumption of each power phase of a three-phase power is monitored to generate a derived power utilization over a selected time period. The derived power utilization over the selected time period is used to load balance an overloaded power phase. Temperature levels, electromagnetic interference (EMI) levels, and resource size parameters associated with each power phase may also be measured. The derived power utilization data may be compared with a power utilization threshold to identify the overloaded power phase. A power consumption overload of a power phase associated with a resource in the data center may be detected or identified, which may be identified by using one or more database tables defined herein containing power utilization data monitored over a defined period of time. A least utilized power phase may be identified according to the derived power utilization. For example, each power phase may be compared to each other and/or a power threshold to identify the least utilized power phase. A least utilized rack may be identified according to the derived power utilization that is associated with the least utilized power phase. For example, each rack associated with each power phase may be compared to each other and/or a power threshold to identify the least utilized RDU associated with the least utilized rack.

In one aspect, the least utilized power phase may be selected according to the derived power utilization, temperature levels, electromagnetic interference (EMI) levels, and resource capacity levels to load balance resources in the data center. New or unused resources may be added, migrated, shifted, and/or reallocated from a first power phase to a second power phase according to the derived power utilization. A determination may be performed for making a first power phase match a second power phase for accepting a new, migrated, shifted, and/or reallocated resource or unused resource.

In one aspect, a primary power source may be selected for the first power phase from the derived power utilization over the selected time period for the migrating the resource or the unused resource. A secondary power source may be selected for the second power phase from the derived power utilization over the selected time period for the migrating the resource or the unused resource.

Figure 4:
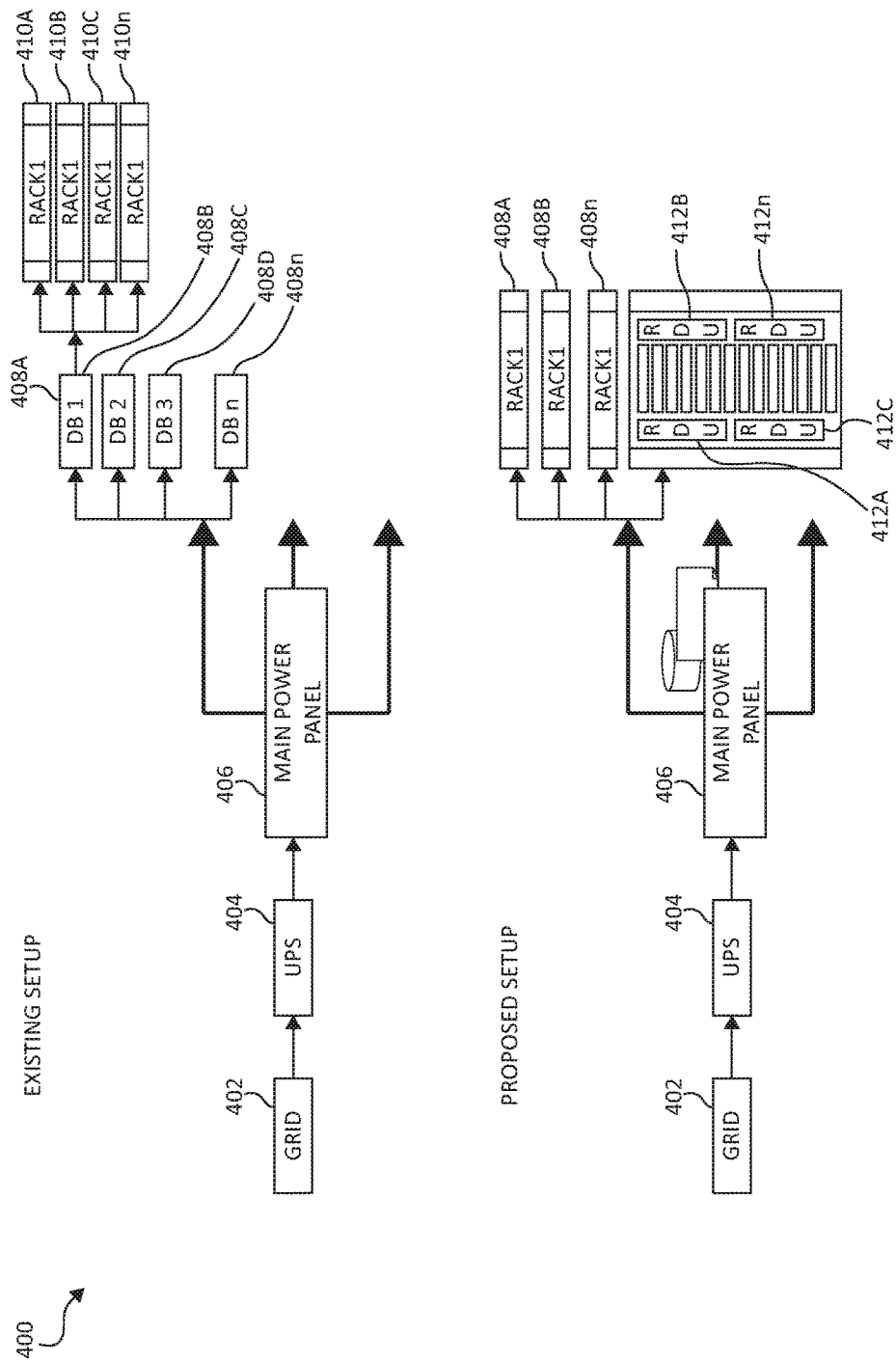
FIG. 4 is a block diagram depicting smart power phase energy level monitoring in accordance with aspects of the present technology.

Turning now to FIG. 4, a block diagram depicting exemplary functional components 400 according to various mechanisms of the illustrated embodiments compared to existing mechanisms, is shown. FIG. 4 depicts an "existing setup" of data centers as currently deployed. A power grid 402 may supply power to the UPS 404. The three phase UPS can distribute three phase power to a main power panel power 406. In the existing setup (e.g., a legacy data center), power distribution boxes (DB) 408a-n are connected to the main power panel for distributing the three phase power supplies to one or more racks, such as rack 410a-n. (DB 408a-n and rack 410a-n may be collectively or individually referred to herein as "DB 408" or "rack 410").

In contrast, the proposed setup (e.g., the present technology) eliminates the power DBs 408 and directly connects the main power panel to the racks 410 and one or more rack distribution units 412a-n (herein after collectively or individually referred to as "RDU 412"). In one aspect, the proposed setup may include at least one processor, one or more database (DB), including database tables, and a console enabled within the main power panel 406, from which power cables directly connect to the Rack Distribution Units (RDUs) 412 thereby eliminating any DBs 408. Such direct connection without the DBs 408 is further illustrated in FIG. 5.

Figure 5:
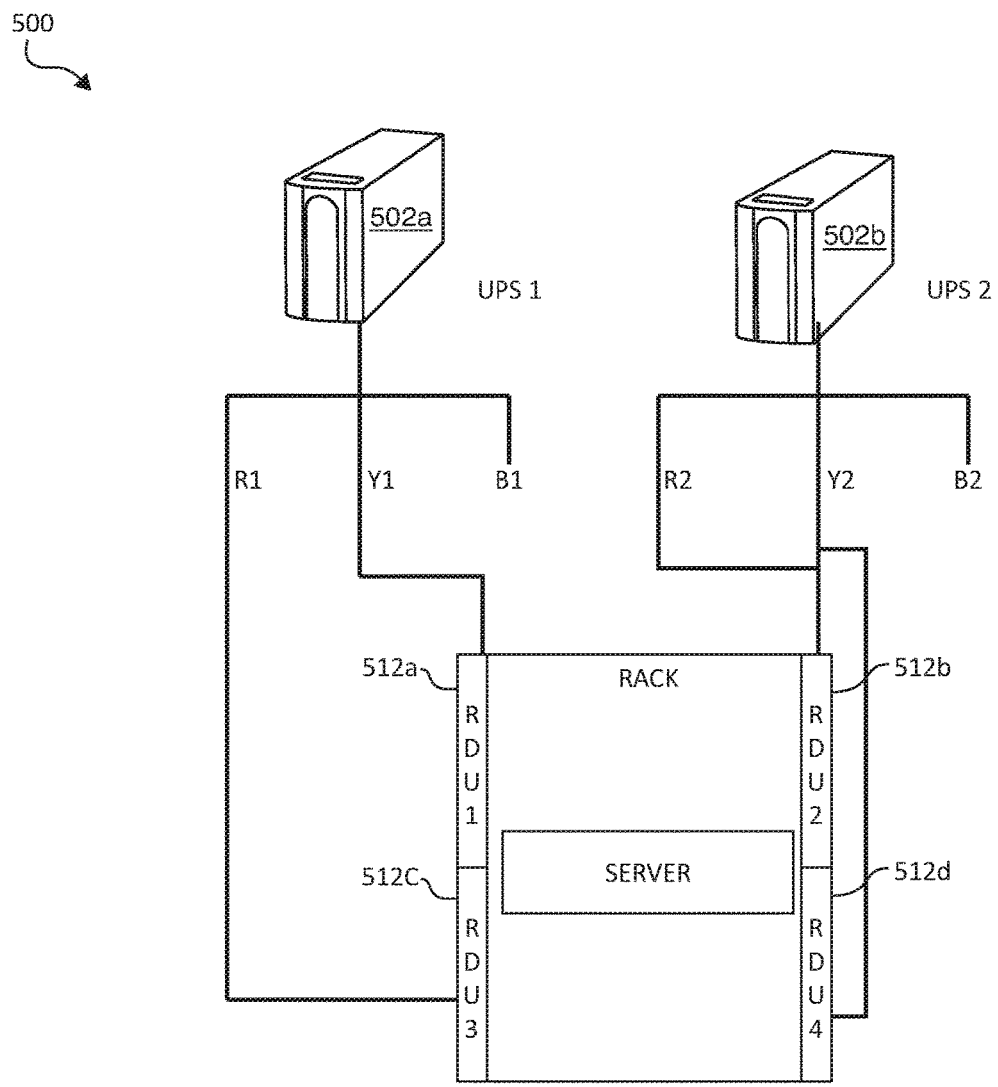
FIG. 5 is an additional block diagram depicting smart power phase energy level monitoring in accordance with aspects of the present technology.

In one aspect, FIG. 5 may include a data center 500. The data center 500 may include one or more UPS, such as UPS 1 502a and UPS 2 502b. Each UPS 502a-b may provide a three-phase power supply (e.g., $R_1$ phase, $Y_1$ phase, $B_1$ phase and $R_2$ phase, $Y_2$ phase, $B_2$ phase power supplies). In one aspect, $R_1$ phase may be directly connected to RDU 3 512c. $Y_1$ phase may be directly connected to RDU 1 512a. $B_1$ phase may be neutral. In one aspect, $R_2$ phase may be directly connected to RDU 2 512b. $Y_2$ phase may be directly connected to RDU 4 512d. $B_2$ phase may be neutral. Each RDU may be in a rack and/or associated with a server.

Consider the following example of an implementation of the aforementioned functionality. In one aspect, a main power panel, having at least one processor, one or more databases (DB), and a console may measure and control the power utilized by computing network-enabled equipment (e.g., servers and RDUs) connected to each of the three power phases by capturing and analyzing monitored and measured power consumption data. In one aspect, real-time power utilization of the equipment may be monitored and measured over a selected period of time for a defined time period duration. For example, the selected period of time be at intervals of seconds, minutes, hours, and/or days. In addition, the monitoring may also include monitoring the temperature, the electromagnetic compatibility (EMC) and electromagnetic interference (EMI), and equipment size parameters and/or slot availability of the equipment. In one aspect, the measuring and/or calculating operations as used herein may include one or more mathematical operations or functions (e.g., using addition, subtraction, division, multiplication, standard deviations, means, averages, statistical modeling using statistical distributions, etc.).

The results of measured real-time power utilization of the equipment may be stored in one or more database tables taking into consideration the measured temperature, the EMC and EMI, and equipment size parameters and/or slot availability. Using the stored data, historical power utilization data (e.g., historical power utilization data covering at least one month) for equipment may be calculated from the real-time power utilization data. Also, historical power utilization (e.g., monthly historical power utilization) for each rack and each of the three phases may then be derived from the historical power utilization data. In other words, the power consumption of each power phase of a three-phase power may be monitored to generate a derived power utilization over a selected time period, such as a month. The derived power utilization may then be used to load balance an overloaded power phase.

More specifically, the derived power utilization data may be compared with a power utilization threshold to identify the overloaded power phase. A power consumption overload of a power phase associated with a resource in the data center may be identified. In one aspect, a least utilized power phase may be selected according to the derived power utilization, temperature levels, electromagnetic interference (EMI) levels, and resource capacity levels to load balance resources in the data center. Also, a first power phase identified from the derived power utilization data that matches a second power phase may be determined and identified for accepting a new or migrating resource. A first power phase from the derived power utilization may be selected as the primary power source for the new or migrating resource. A second power phase from the derived power utilization may be selected as the secondary power source for the new or migrating resource.

The derived power utilization may also be used to provide a predictive power consumption analysis to determine capacity utilization, efficiency, power consumption effects for adding, reallocating, and/or consolidating resources as needed at a rack level. In one aspect, the derived power utilization may be used to generate reports and provide metrics and statistical analysis. The derived power utilization data at the equipment level, the rack level, and the phase levels may also be used to suggest or indicate a location or equipment capable of receiving new or reallocated equipment based on relative utilization of the phase, rack, and equipment. For example, resources from a first power phase (e.g., R phase) may be reallocated to a second power phase (Y phase) according to the derived power utilization data. Thus, providing data that includes an indication of migrating, reallocating, and/or shifting of equipment causing a power phase overload from a first phase associated with a first rack to an alternative phase associated with an alternative rack optimizes and increases the power utilization efficiency while decreasing, if not eliminating, power drops in the data center.

In one aspect, the following tables depict database tables that may be stored in the main power panel for smart power phase energy level monitoring and controlling load balancing. In one aspect, each of the database tables below may be used to store data relating to monitoring and measuring real-time power consumption for the selected time period while also detecting other factors, parameters, or attributes relating to power phase energy level monitoring and detection in a data center.

For example, database table 1 depicts a table of racks as compared to a RDUs (e.g., Racks vs. RDUs). The columns of database table 1 may be labeled with a server serial number "SSNo", rack distribution unit (RDU) serial number "RDUSNo", a rack's monthly power consumption "RkPCon$_m$", a device phase "$D_p$" (e.g., the power phase of the device), and a size capacity of a rack.

TABLE 1

| | | Racks vs. RDUs | | | |
|---|---|---|---|---|---|
| SS: No | Rack ID | Duson | RkPCons$_m$ | Dp | Capacity |

Database table 2 depicts a table of rack details. The columns of database table 2 may be labeled with a server serial number "SSNo", rack distribution unit (RDU) serial number "RDUSNo" (depicted with four RDUs), device phase "$D_p$", the rack's monthly power Consumption "RkPCon$_m$", the temperature of the rack, and a size capacity of a rack (measured in "U" or rack unit).

In one aspect, a rack unit "U" or "RU" may be a unit of measure that describes the height of equipment designed to mount in a rack, such as, for example a 19-inch rack or a 23-inch rack. The 19-inch (482.6 mm) or 23-inch (584.2 mm) dimension may refer to the width of the equipment mounting frame in the rack including the frame; the width of the equipment that can be mounted inside the rack is less. One rack unit may be predefined and/or defined as 1.75 inches (44.45 mm) high. It should be noted that the rack unit measurement may be defined according to manufacture, user, or administrator preference. Thus, the measurements provided herein are by way of example only.

TABLE 2

| | | | | Rack Details | | | |
|---|---|---|---|---|---|---|---|
| Rack Serial No | RD1 SNo | RDU2 SNo | RDU3 SNo | RDU4S No | Rack Power Consumption | Temperature of the rack | Size of the rack (in U) |

Database table 3a depicts an additional table of rack details (which may be separate and/or included with table 2). The columns of database table 3a may be labeled with a rack distribution unit (RDU) serial number "RDUSNo", a number (No.) of sockets, and the size capacity of a rack (measured in "U" or rack unit).

TABLE 3a

| | RDU Details | |
|---|---|---|
| RDUSNo | No. of sockets | Capacity |

Database table 3b depicts a table of rack details. The columns of database table 3 may be labeled with a rack distribution unit (RDU) serial number "RDUSNo", a total number of sockets, a number of unused sockets (e.g., a number of sockets that are not connected to any hardware device), a list of unused sockets (e.g., an array of sockets), power consumption of the RDU, a rack of the RDU, a phase of the RDU, the EMI/RFI (radio frequency interference), the EMC, and the serial numbers of the servers that are connected to hardware). In one aspect, the data for the database table 3 may be automatically stored by column.

TABLE 3b

| | | | | RDU Details | | | | | |
|---|---|---|---|---|---|---|---|---|---|
| RDU SNo | Total no. of sockets | No. of sockets unused | Unused socket List (array) | Power cons. of the RDU | Rack of the RDU | Phase of the RDU | EMI/ RFI | EMC | Serial No.'s of Servers Conn. |
| t | Di | DSNo | DCat | Dp | PConr | RDU SNo | SSNo | | |

Database table 4 depicts a table for data population for scanning a device list. The database table 4 may include a timestamp "t", device identification "$D_i$", device category "$D_{cat}$", real-time power consumption "PCon$_r$", a RDU serial number "RDUSNo", and Server Serial Number "SSNo".

TABLE 4

| | | | Scan device list | | | |
|---|---|---|---|---|---|---|
| t | Di | DSNo | DCat | Dp | PCon$_r$ | RDUSNo | SSNo |

The database table 5 depicts a table of distinct device serial number and category. It should be noted that one or more other database tables as illustrated herein may be queried to obtain the distinct device serial number and category, such as a real time power consumption table.

TABLE 5

| Distinct device serial number and category | |
|---|---|
| DSN$_0$ | DCat |

The database table 6 depicts a table for data population of monthly power phase consumption for devices grouped by the three phase. The database table 6 may be labeled with columns that include the month, the phase (e.g., R phase, Y phase, and B phase), and each of the phase's monthly power consumption "$PPCon_m$". In one aspect, it may be assumed that each of the devices are connected to a computing network for maintaining the database tables.

TABLE 6

| | Monthly Power Consumption of the Phase | |
|---|---|---|
| Month | Phase | Monthly power consumption of the phase |

In one aspect, database table 6 may be used for installation of new or unused equipment. In one aspect, the main power panel may receive the following parameters of the new equipment: 1) equipment serial number, 2) Equipment Category, and/or 3) equipment size in terms of rack unit. In order to install the new or unused equipment, the following operations may be performed. In a first step, a first path may be identified. The first path may include a first phase (Phase1) associated with a first rack, a first RDU, and a first socket from a first power source (e.g., Phase 1→Rack1→RDU1→Socket1 from Power source: 1).

In a second step, a second path may be identified. The second path may include a second phase (Phase 2) associated with a second rack, a second RDU, and a second socket from a second power source (e.g., Phase 2→Rack2→RDU2 Socket2 from Power source: 2). In a third step, a determination is made to verify that Rack1 and Rack2 found in the first path and the second path are the same. If the first rack and the second rack are the same, the first path having the first phase, first rack, first RDU, and the first socket may be selected for the primary power source for the new or unused equipment. Also, the second path having the second phase, second rack, second RDU, and the second socket may be selected for the secondary power source for the new or unused equipment. In a fourth step, if any of the racks (e.g., Rack1, Rack2), RDUs (RDU1, RDU2) or sockets (e.g., Socket1, Socket2) identified in the first path and second path are unavailable then a notification may be provided and/or sent indicating there is no space available for receiving and/or accepting the new or unused equipment (e.g., "No space available for the equipment"). In a fifth step, if the first rack and second rack are not the same, one or more alternative racks sets may be searched for and analyzed to determine a matching set of racks by repeating the above described steps. It should be noted that a least utilized phase, rack, RDU, and socket in a same path may also have a target size, target EMUEMC (e.g., an EMUEMC being less than an EMI/EMC target threshold), and target cooling conditions (e.g., a cooling condition being less than a cooling condition threshold) are to be selected.

The database table 7 depicts a table of server details. The database table 7 may be labeled with columns that include the server serial "SSNo", server unit size, a mode of the power supply, a primary source (e.g., a first RDU and socket), a secondary source (e.g., a second RDU and socket), dependent functional hardware and serial (S1) numbers, and dependent functional hardware type.

TABLE 7

| | | | Server Details | | | |
|---|---|---|---|---|---|---|
| Server SNo | Server U Size | Mode of Power supply | Primary source: RDU1 (& socket) | Secondary source: RDU2 (& socket) | Dependent functional hardware: S1 no | Dependent functional hardware type |

Database table 8 depicts a table of the real time power consumption for a duration of time that may be queried for a device serial number "DSNo", device category "$D_{cat}$", as described in database table 5. The database table 8 may be labeled with columns that include a time or timestamp "t" (e.g., a time period during which a device scan may be executing), a device serial number "DSNo" of the device being scanned, device category "$D_{cat}$" (e.g., the category of the scanned device, which may categorized as, for example, a server, or storage), EMC, EMI/RFI, and real-time power consumption "$PCon_r$". The database table 8 depicts a table of data for each RDU.

TABLE 8

| Real Time Power Consumption for a duration of time (e.g., 30 days) | | | | | |
|---|---|---|---|---|---|
| Time | Device Serial No | Device Category | EMC | EMI/RFI | Real time power consumption |

Database table 9 depicts a table of the monthly power consumption for a duration of time. The database table 9 may be labeled with columns that include the month (e.g., a time period during which a device scan may be executing), a device serial number "DSNo" of the device being scanned, device category "$D_{cat}$" (e.g., the category of the scanned device, which may categorized as, for example, a server, or storage), EMC, EMI/RFI, and monthly power consumption "$PCon_m$". The monthly power consumption may be derived from the real time power consumption table 8 for each device. In one aspect, the term month, as used herein, may refer to the current month to a time period up to a defined hour during a last day of the month. That is, a month may represent a current month (during a last day of the month).

TABLE 9

| Monthly Power Consumption for a duration of time (e.g., 30 days) | | | | | |
|---|---|---|---|---|---|
| Month | Device Serial No | Device Category | EMC | EMI/ RFI | Monthly Power Consumption |

Consider the following example of an implementation of the aforementioned functionality. To populate the data in database table 9, the phase's monthly power consumption "$PPCon_m$" may be fetched from database table 1 for the monthly power phase consumption for each row beginning from the "RDUSNo" column. The rack's monthly power consumption "$RkPCon_m$" may be calculated and then entered into a row of the "$RkPCon_m$" column. Each device's phase "$D_p$" may be entered and updated.

Figure 6:
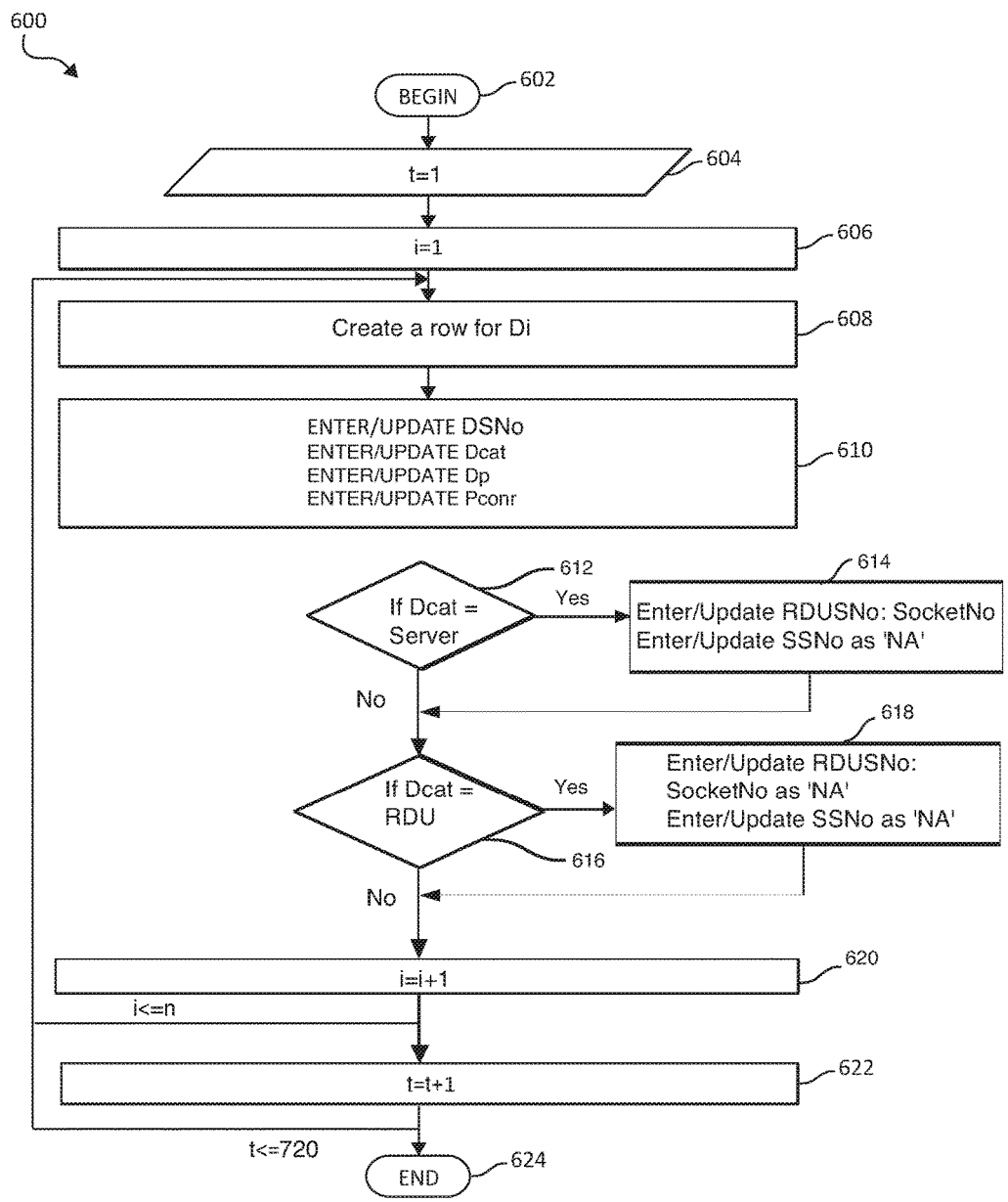
FIG. 6 is a flowchart for populating one or more database tables in a main power panel in which aspects of the present technology may be realized.

Turning now to FIG. 6 a flowchart 600 for populating one or more database tables in a main power panel is depicted. In one aspect, the power utilization along with the EMI and EMC may be captured for a selected time period (e.g., every second, minute, hour, etc.) for a defined duration of time, such as 30 days in a month. The flowchart depicts data population of a table for real time power utilization or consumption during a selected time period, such as a month, (see database tables heretofore described). The functionality 600 may be implemented as a method and executed as instructions on a machine, where the instructions are included on at least one computer readable medium or on a non-transitory machine-readable storage medium. For example, the operation may start, as in block 602. Time may be set equal to one "1", as in block 604. A variable "i" may be used in a counter and set equal to one "1", as in block 606, and is to run a loop for "n" number of records until i is less than or equal to n (e.g., i=1 till i<=n). A new row may be created for device identification (ID) "$D_i$", as in block 608. In block 610, the Device Serial Number "DSNo", the device category "$D_{cat}$", device phase $D_p$, and real-time power consumption "$PCon_r$" may be entered and/or updated. At block 612, if the device category "$D_{cat}$" server, is equal to a seer, the RDU serial number "RDUSNo" and socket number (No) may be entered and updated in table 1 and the server serial "SSNo" may also be entered or updated as not available "NA", as in block 614. Alternatively, from block 612, if no, the device category "$D_{cat}$" may be compared to determine if the "$D_{cat}$" is equal to an RDU, as in block 616. If yes in block 616, the RDU serial number "RDUSNo" and socket number (No) may be entered and updated in table 1 as "NA" and the server serial "SSNo" may also be entered or updated as "NA", as in block 618. From blocks 616 or 618, the variable "i" may be increased by a value of one "1", as in block 620, while the time value 't' may also be increased by a value of 1, as in block 622. If at block 620, the variable "i" is less than or equal to 'n' (where 'n' may be a selected value and/or positive integer), the method 600 may return to block 608. In similar fashion, if the variable "t" is less than or equal 720 (e.g., 720 seconds), the method 600 may return to block 608. The operations 600 may end, as in block 624.

Figure 7:
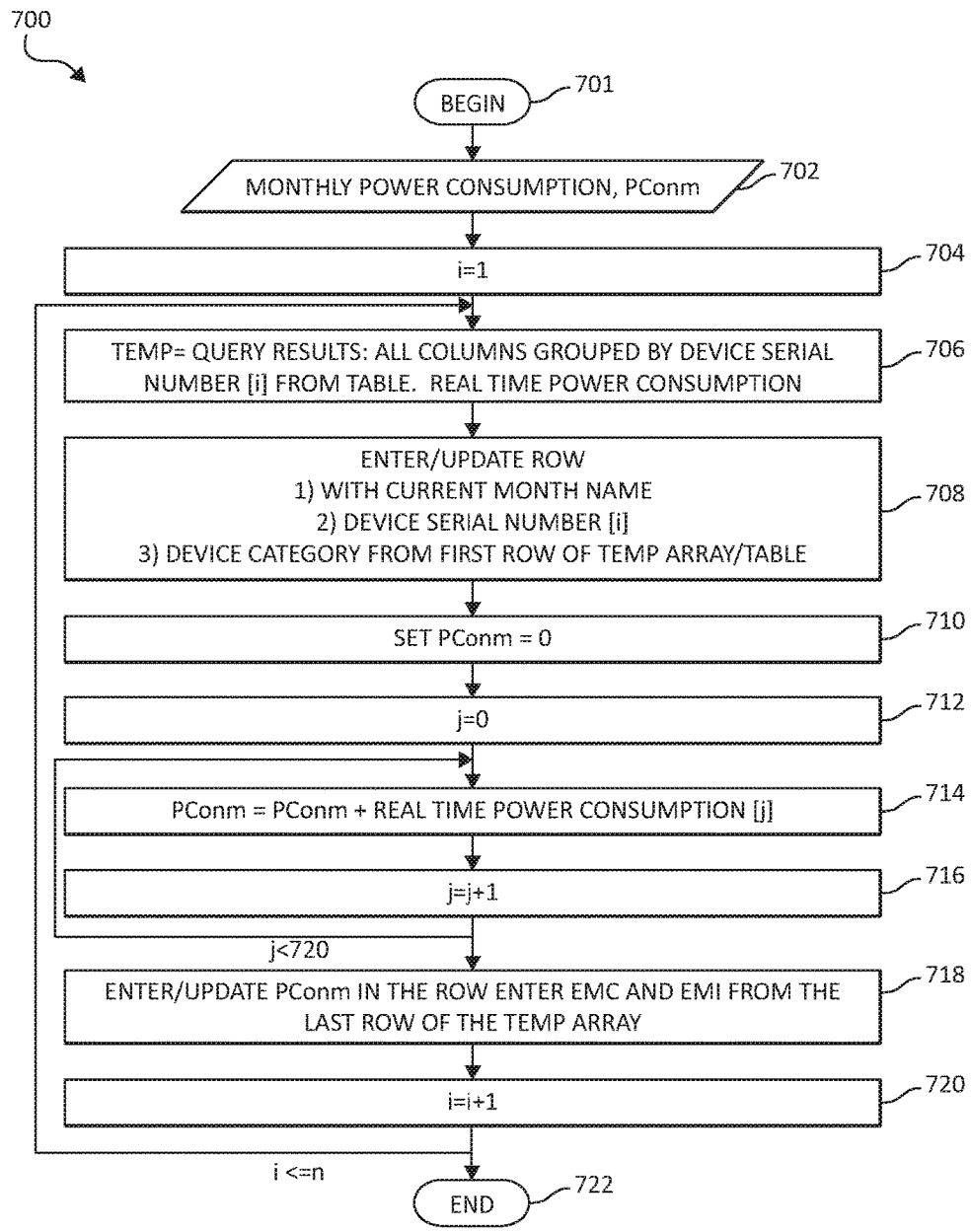
FIG. 7 is a flowchart depicting an additional exemplary method for smart power phase energy level monitoring by a processor, again in which aspects of the present technology may be realized.

FIG. 7 is a flowchart diagram depicting an additional exemplary method for smart power phase energy level monitoring. The functionality 700 may be implemented as a method and executed as instructions on a machine, where the instructions are included on at least one computer readable medium or one non-transitory machine-readable storage medium. For example, the operation may start for monthly power consumption, as in blocks 701 and 702. In block 704, i may be set equal to one "1". In one aspect, one or more database tables as described herein may be used to query results of all columns grouped by device serial number "DSNo", as in block 706. At block 708, a new row with a device identity in a first row of a temporary array of devices may be entered or updated. That is, a new row with current month name, device serial number, device category may be entered and/or updated. The operation may run a loop for "n" number of records until "i" is less than or equal to n (e.g., i=1 till i<=n). The monthly Power Consumption $PCon_m$ may be set to a value equal to zero, as in block 710. A "j" value may be set equal to zero "0", as in block 712. The monthly Power Consumption $PCon_m$ may include the monthly Power Consumption $PCon_m$ added to the real-time power consumption "$PCon_r$", as in block 714. J may be set equal to J plus 1 (e.g., J=J+1), as in block 716. As in block 718, the monthly Power Consumption $PCon_m$ may be updated in the row of database table 8 the monthly Power Consumption $PCon_m$ and also the EMC and EMI may be entered and/or updated (e.g., enter the EMC and EMI from the last row of a temporary array). The value "i" may be increased by a factor or value of 1, as in block 720. If the value "i" is less than equal to the number (No.) of device n", the operations of method 700 may return to block 706. The functionality of the method may end, as in block 722.

Figure 8:
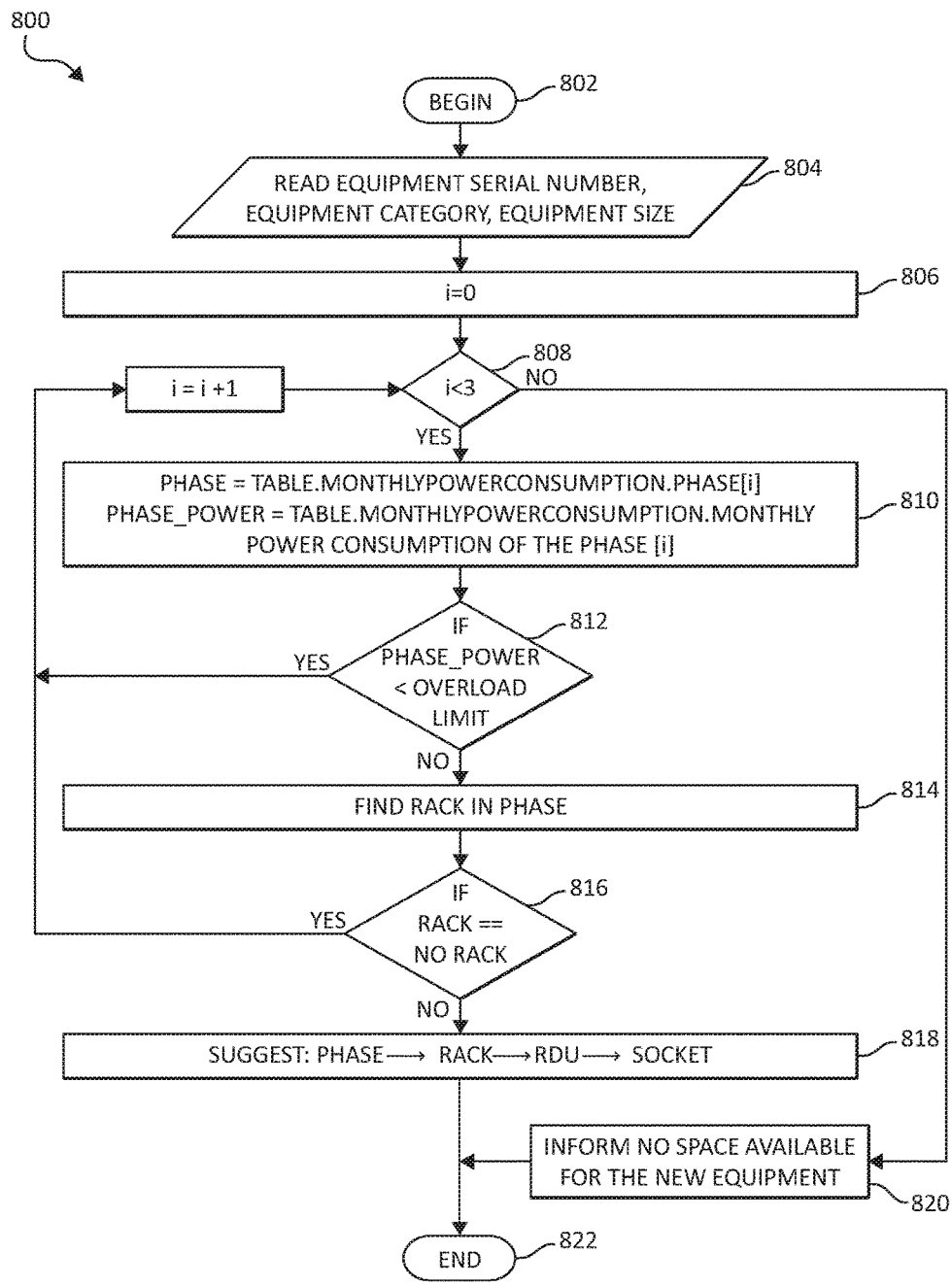
FIG. 8 is a flowchart depicting an additional exemplary method for identifying a least utilized power phase in which aspects of the present technology may be realized.

FIG. 8 is a flowchart diagram depicting an additional exemplary method for identifying a least utilized power phase. The functionality 800 may be implemented as a method and executed as instructions on a machine, where the instructions are included on at least one computer readable medium or on a non-transitory machine-readable storage medium. For example, the operation may start, as in block 802. In block 804, the equipment serial number, equipment category, and/or equipment size may be read. An "i" value or variable may be set equal to zero "0", as in block 806. At block 808, a determination is made to ascertain whether the value of "i" is less than a defined value, such as 3. If no at block 808, a notification may be sent that indicates there is no available space and/or a notification is sent that indicates that equipment cannot be placed in the rack, RDU, or socket, as in block 820. If yes at block 808, a phase, the power of the phase, and the amount of consumption of the phase may be determined using one or more database tables, such as database table 6 of the monthly power consumption and table 9 of the monthly power consumption and consumption of the phase may be used, as in block 810. That is, in block 810, the power phase is being checked and then the power consumption of a particular phase is calculated from the one or more database tables. A determination is made as to whether the phase of the power is less than the overload limits (e.g., power overload threshold), as in block 812. If no at block 812, the functionality moves to block 814 and attempts to find a rack in the path with the phase. A rack may be searched for to determine whether one or more racks are in phase, as in block 816. That is, if "Rack=No Rack" is "yes" this means there is not space identified in the rack and another rack is searched for and selected. If "Rack=No Rack" is "no" this means there is space in the rack so as to be able to suggest a phase, a rack and RDU, and a socket (as in block 818). In block 818, a phase, rack, RDU, and/or socket may be suggested for a least utilized phase, rack, RDU, and/or socket. The functionality 800 may end at block 822.

In one aspect, the functionality of FIG. 8 may be performed independently and/or in conjunction with other FIGS. In summary, the functionality of FIG. 8 may read database table 2 and select a least utilized power phase (as compared to other power phases (e.g., a non-overloaded power phase which may be determined by comparing to other power phases and/or compared to a power phase utilization threshold). For each month database table 2 can have up to three records for each power phase (e.g., power phases R, Y and B). Thus, a counter with the variable "i" set initially to 0 may increase until "i" is less than 3 (e.g., I=0 until i<3). The counter may be used to read the three records for each power phase and pick the least utilized power phase. If a least utilized power phase is located or identified, then the functionality may proceed to FIG. 9, which may be for identifying a rack in a least utilized power phase (e.g., "Find a rack in phase"). If a least utilized power phase is unable to be identified or found, a notification is sent that the equipment cannot be placed in the rack.

Figure 9:
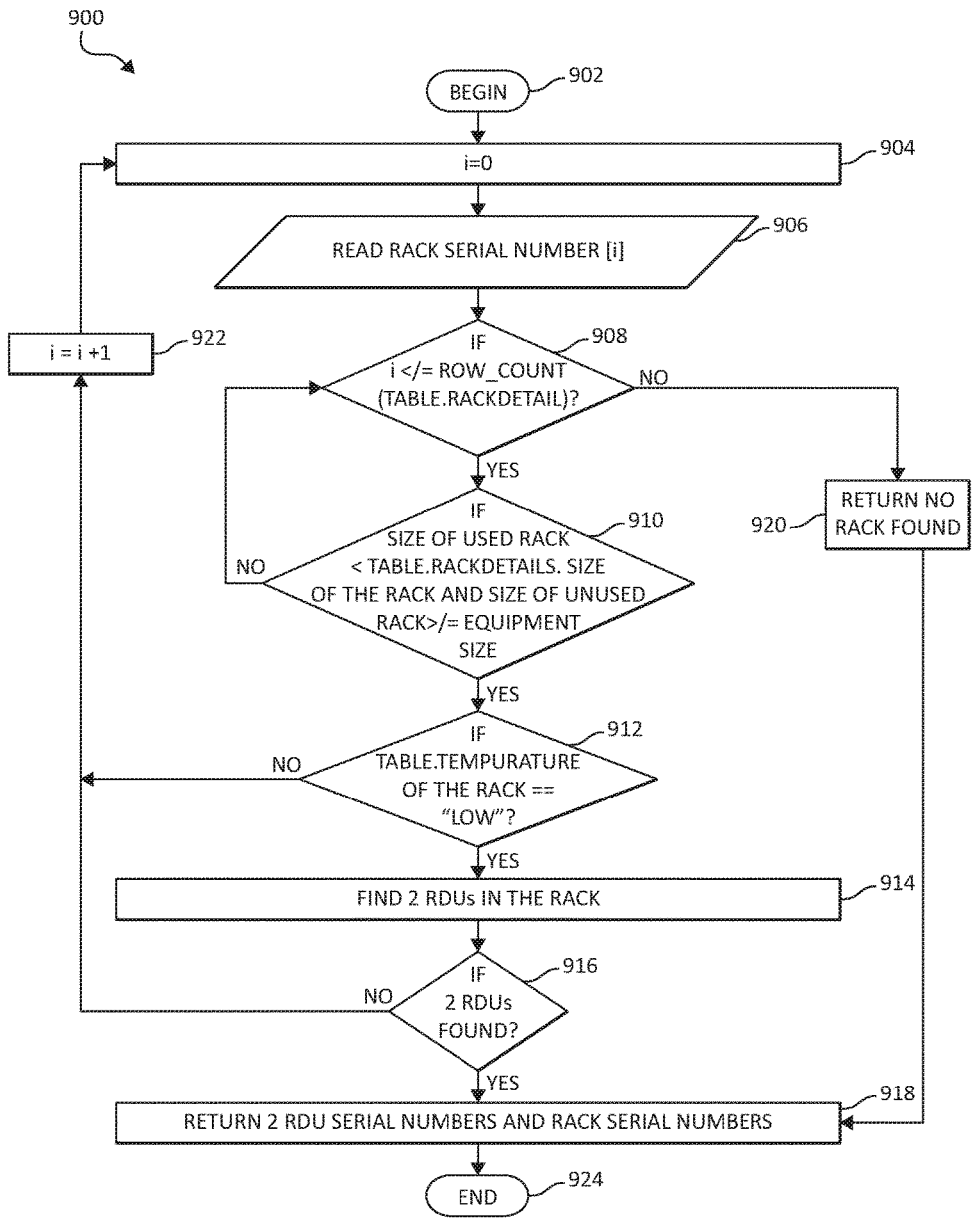
FIG. 9 is a flowchart depicting an additional exemplary method for identifying a rack in a least utilized power phase by a processor, again in which aspects of the present technology may be realized.

FIG. 9 is a flowchart diagram depicting an additional exemplary method for identifying a rack in a least utilized power phase. The functionality 900 may be implemented as a method and executed as instructions on a machine, where the instructions are included on at least one computer readable medium or on a non-transitory machine-readable storage medium. For example, the operation may start, as in block 902. In block 904, an "i" value may be set equal to zero "0". The rack serial number may be read and analyzed, as in block 906. The size of a used rack may be analyzed to determine if the size of the used rack is less than or equal to the row count of a database table, such as, for example, the rack details database table 2, as in block 908. If no at block 908, the functionality 900 moves to block 920, indicating that no rack is located. After block 920, the functionality 900 moves to block 918. If yes at block 908, the functionality 900 may move to block 910. A determination is made, using a database table, such as, for example, the rack details database table 2a to check if the size of a rack that is currently being used (e.g., a rack connected and used in the data center) is less than the size of a new or unused rack, as in block 910. If no at block 910, the functionality 900 may return to block 908. If yes at block 910, a determination is also performed to determine, from one or more databases, if the temperature of the rack is equal to and/or below a target temperature, as in block 912. In block 914, at least two RDUs in the rack may be attempted to be identified or located. A determination is made to determine if the two RDUs are actually located, as in block 916. If no at block 916, the functionality 900 may move to back to block 922. The value "i" may be increased by a factor or value of 1, as in block 922. If yes at block 916, serial number for the two RDUs and the serial number of the rack are located and retrieved (e.g., using one or more databases), as in block 918. The functionality 900 moves to block 922 and may end, as in block 924.

In summary, if a rack using a least utilized power phase is able to be identified using FIG. 8, the functionality of FIG. 9 may be performed independently and/or in conjunction with FIG. 8. The rack details database table 2 may be read and a power efficient rack (e.g., a rack that utilizes less power that has a targeted size and temperature conditions) is attempted to be identified. If a power efficient rack is identified, the functionality may move to FIG. 10 for identifying a RDU in the rack using a least utilized power phase (e.g., identify RDUs in the rack) may be executed. If no power efficient rack is located, a notification is sent that the equipment cannot be placed in the rack.

Figure 10:
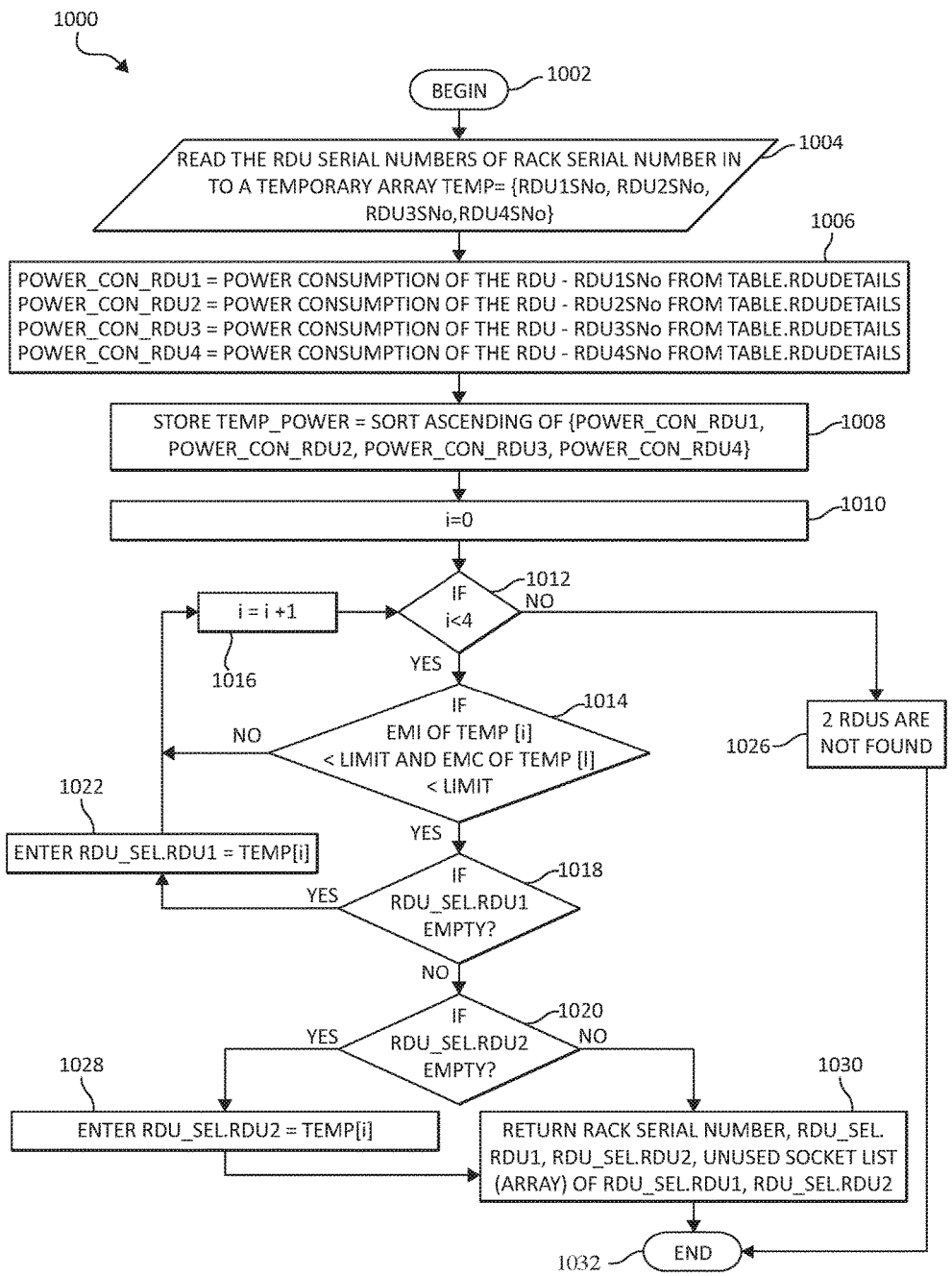
FIG. 10 is a flowchart depicting an additional exemplary method for identifying an RDU in the rack using a least utilized power phase in which aspects of the present technology may be realized.

FIG. 10 is a flowchart diagram depicting an additional exemplary method for identifying a RDU in the rack using a least utilized power phase. The functionality 1000 may be implemented as a method and executed as instructions on a machine, where the instructions are included on at least one computer readable medium or on a non-transitory machine-readable storage medium. For example, the operation may start, as in block 1002. In block 1004, the serial number of the RDU of a rack (e.g., read serial numbers of the rack) into a temporary array of RDUs (e.g., Temp={RDU1SNo., RDU2SNo., RDU3SNo., RDU4SNo.}). That is, the power consumption of each RDU is calculated or determined from the database tables 3a and/or 3b, as in block 1006. The temperate and power of the RDU may be measured and sorted in an ascending order of the temporary array of RDU's, as in block 1008. A variable "i" may be set equal to one "0", as in block 1010. A determination is made as to whether the variable "i" is less than 4, as in block 1012. If no at block 1012, a notification that two RDUs are not located is sent, as in block 1026. From block 1026, the functionally 1000 may end at block 1032. If yes at block 1012, a determination is made as to whether the EMI and EMC of an RDU of temporary array [i] is less than an EMI threshold limit and an EMC threshold limit, as in block 1014. If no at block 1014, the functionality 1000 may move to block 1016 where i may be increased by a value of one "1", as in block 1016. From block 1016, the functionality 1000 may move back to block 1012. If yes at block 1014, a determination is made as to whether the first RDU in the temporary array (e.g., RDU1) is empty, as in block 1018. If yes at block 1018, the first RDU is selected and set as the RDU in the temporary array [i], where the variable i represents the selected RDU, as in block 1022. From block 1022, i may be increased by a value of one "1", as in block 1016. From block 1016, the functionality 1000 may move back to block 1012.

If no at block 1018, a determination is made as to whether the second RDU in the temporary array (e.g., RDU1) is empty, as in block 1020. If yes at block 1020, the second RDU is selected and set as the RDU in the temporary array [i], where the variable i represents the selected RDU, as in block 1028. The functionality 1000 moves from block 1028 to block 1030. If no at block 1020, serial numbers for both the first RDU and the second RDU and a socket list for the first RDU and the second RDU are located (from one or more database tables) and obtained, as in block 1030. The functionally 1000 may end at block 1032.

In summary, if an RDU in the rack using a least utilized power phase is able to be identified using FIG. 9, the functionality of FIG. 10 may be performed independently and/or in conjunction with FIG. 9. The database tables 3a and/or 3b (e.g., the RDU details) may be read and an RDU may be selected according the power consumption while also considering EMI/EMC factors. If a power efficient utilization RDU is located, one or more available sockets are located and the RDU details are returned and used in FIG. 10. A complete path having a phase, rack, RDU, and socket may be identified and suggested (e.g., Phase1→Rack1→RDU1→Socket1). If no power efficient utilization RDU is found, a notification is sent that the equipment cannot be placed in the rack or RDU.

In an additional aspect, one or more new or unused resources (e.g., computing devices, servers, racks, etc.) may be installed into the data center. Using the database tables as described herein, the present technology may execute an operation to 1) read the monthly power phase consumption of database table 1020 and may select one of the phases that has the least used power phase as compared to the other power phases. That is, the least utilized power phase according to the derived power utilization, temperature levels, electromagnetic interference (EMI) levels, and resource capacity levels indicated in the monthly power consumption "$PPCon_m$" may be selected to load balance resources in the data center, such as a new or unused resource. 2) For the identified least utilized power phase, the monthly power phase consumption of database table 1020 may again be searched to identify the array of racks connected to the identified least utilized power phase. 3) From the array of racks identified that may be associated with the identified least utilized power phase, a least utilized rack may be identified. That is, the least utilized power phase may be identified according to the derived power utilization and then a least utilized rack may be identified according to the derived power utilization that is associated with the least utilized power phase. 4) For the identified least utilized rack, the database table 1010 of racks compared to the RDUs may be checked and identify one or more array of RDUs in the database table 1010. 5) Using the database table 1010, the number of sockets that are available for use may be identified in one of the RDUs. 6) An optimized location (e.g., a least utilized rack), may be identified and located for installing the new or unused resources (e.g., server) according to the least utilized phase, in the least utilized rack, of the identified RDU.

In one aspect, a power phase overload condition may be identified using the database tables described herein. In one aspect, a power overload identification trigger may be associated with database table 1010 (e.g., the phase's monthly power consumption). The power overload trigger may check the phase's monthly power consumption "PPCon$_m$" of database table 1010 based on a set power overload condition threshold. If the phase's monthly power consumption "PPCon$_m$" is greater than or equal to the power overload condition threshold, a power phase overload is identified. For the identified overloaded phase, an operation may use the database table 1010 to identify the rack, the RDU, and the socket that may be consuming an increased amount of phase power as compared to other racks, RDUs, and the sockets.

Figure 11:
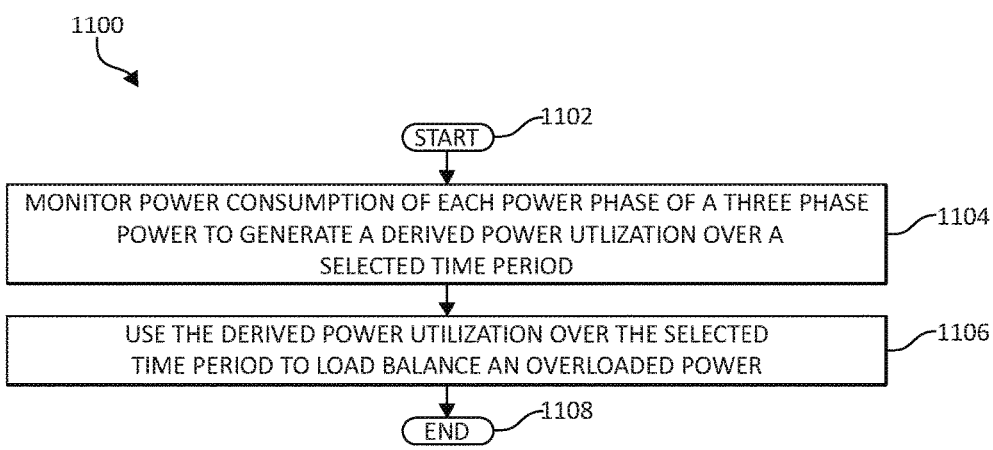
FIG. 11 is a flowchart depicting an additional exemplary method for smart power phase energy level monitoring and measuring temperature by a processor, again in which aspects of the present technology may be realized.

FIG. 11 is a flowchart diagram depicting an additional exemplary method 1100 for smart power phase energy level monitoring and measuring temperature by a processor, again in which aspects of the present technology may be realized. The functionality 1100 may be implemented as a method executed as instructions on a machine, where the instructions are included on at least one computer readable medium or on a non-transitory machine-readable storage medium. The functionality of the method may start, as in block 1102. The power consumption of each power phase of a three-phase power may be monitored to generate a derived power utilization over a selected time period, as in block 1104. The derived power utilization may be used over the selected time period to load balance an overloaded power phase, as in block 1106. The method 1100 may end at block 1108.

The present technology may be a system, a method, and/or a computer program product. The computer program product may include a computer readable storage medium (or media) having computer readable program instructions thereon for causing a processor to carry out aspects of the present technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technology.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present technology. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for efficient phase level energy monitoring of a data center, comprising: monitoring power consumption of each power phase of a three phase power to generate a derived power utilization over a selected time period, the monitoring further including measuring temperature levels, electromagnetic interference (EMI) levels, and resource size parameters associated with each power phase; and using the derived power utilization over the selected time period to load balance an overloaded power phase;
   determining a first power phase from the derived power utilization matches a second power phase for accepting a migrating resource or unused resource;
   selecting as a primary power source the first power phase from the derived power utilization over the selected time period for the migrating resource or the unused resource; and selecting as a secondary power source the second power phase from the derived power utilization over the selected time period for the migrating resource or the unused resource.

2. The method of claim 1, further including:
   comparing the derived power utilization with a power utilization threshold to identify the overloaded power phase; and
   identifying a power consumption overload of a power phase associated with a resource of a data center.

3. The method of claim 1, further including:
   identifying a least utilized power phase according to the derived power utilization; or
   identifying a least utilized rack according to the derived power utilization that is associated with the least utilized power phase.

4. The method of claim 1, further including selecting a least utilized power phase according to the derived power utilization, temperature levels, electromagnetic interference (EMI) levels, and resource capacity levels to load balance resources in the data center.

5. The method of claim 1, further including reallocating resources from a first power phase to a second power phase according to the derived power utilization.

6. A system for efficient phase level energy monitoring of a data center, comprising: one or more computers with executable instructions that when executed cause the system to: monitor power consumption of each power phase of a three phase power to generate a derived power utilization over a selected time period, the monitoring further including measuring temperature levels, electromagnetic interference (EMI) levels, and resource size parameters associated with each power phase; and using the derived power utilization over the selected time period to load balance an overloaded power phase;
   determine a first power phase from the derived power utilization matches a second power phase for accepting a migrating resource or unused resource; select as a primary power source the first power phase from the derived power utilization over the selected time period for the migrating resource or the unused resource; and select as a secondary power source the second power phase from the derived power utilization over the selected time period for the migrating resource or the unused resource.

7. The system of claim 6, wherein the executable instructions compare the derived power utilization with a power utilization threshold to identify the overloaded power phase.

8. The system of claim 6, wherein the executable instructions identify a power consumption overload of a power phase associated with a resource of the data center.

9. The system of claim 6, wherein the executable instructions select a least utilized power phase according to the derived power utilization, temperature levels, electromagnetic interference (EMI) levels, and resource capacity levels to load balance resources of the data center.

10. The system of claim 6, wherein the executable instructions reallocate resources from a first power phase to a second power phase according to the derived power utilization.

11. A computer program product, by a processor, for efficient phase level energy monitoring of a data center, the computer program product comprising a non-transitory computer-readable storage medium having computer-readable program code portions stored therein, the computer-readable program code portions comprising: an executable portion that monitors power consumption of each power phase of a three phase power to generate a derived power utilization over a selected time period, the monitoring further including measuring temperature levels, electromagnetic interference (EMI) levels, and resource size parameters associated with each power phase; and an executable portion that uses the derived power utilization over the selected time period to load balance an overloaded power phase;
   determines a first power phase from the derived power utilization matches a second power phase for accepting a migrating resource or unused resource; selects as a primary power source the first power phase from the derived power utilization over the selected time period for the migrating resource or the unused resource; and selects as a secondary power source the second power phase from the derived power utilization over the selected time period for the migrating resource or the unused resource.

12. The computer program product of claim 11, further including an executable portion that:
   compares the derived power utilization with a power utilization threshold to identify the overloaded power phase; and
   identifies a power consumption overload of a power phase associated with a resource of the data center.

13. The computer program product of claim 11, further including an executable portion that selects a least utilized power phase according to the derived power utilization, temperature levels, electromagnetic interference (EMI) levels, and resource capacity levels to load balance resources in the data center.

14. The computer program product of claim 11, further including an executable portion that reallocates resources from a first power phase to a second power phase according to the derived power utilization.

* * * * *